April 30, 1957    M. ROTHSTEIN ET AL    2,790,379
COIN OPERATED FOOD HEATING AND DISPENSING APPARATUS
Filed March 26, 1953    5 Sheets-Sheet 1

INVENTOR.
BY
ATTORNEY

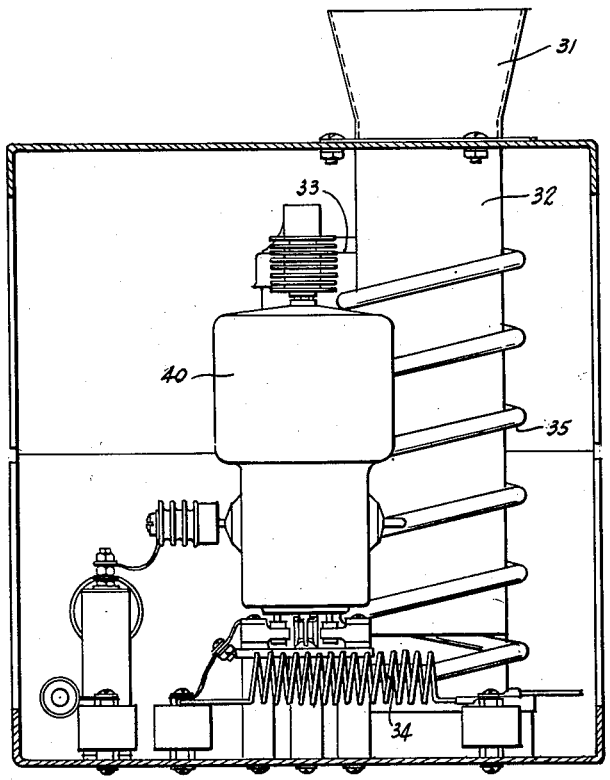
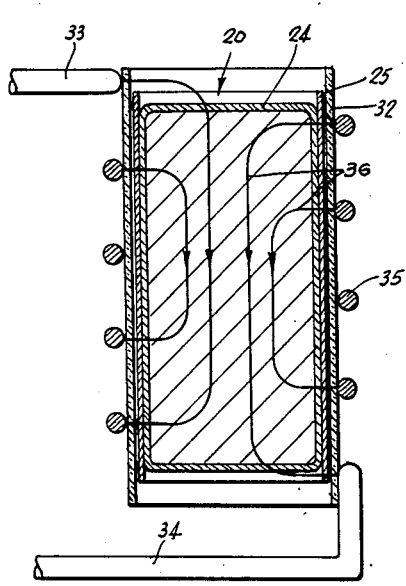

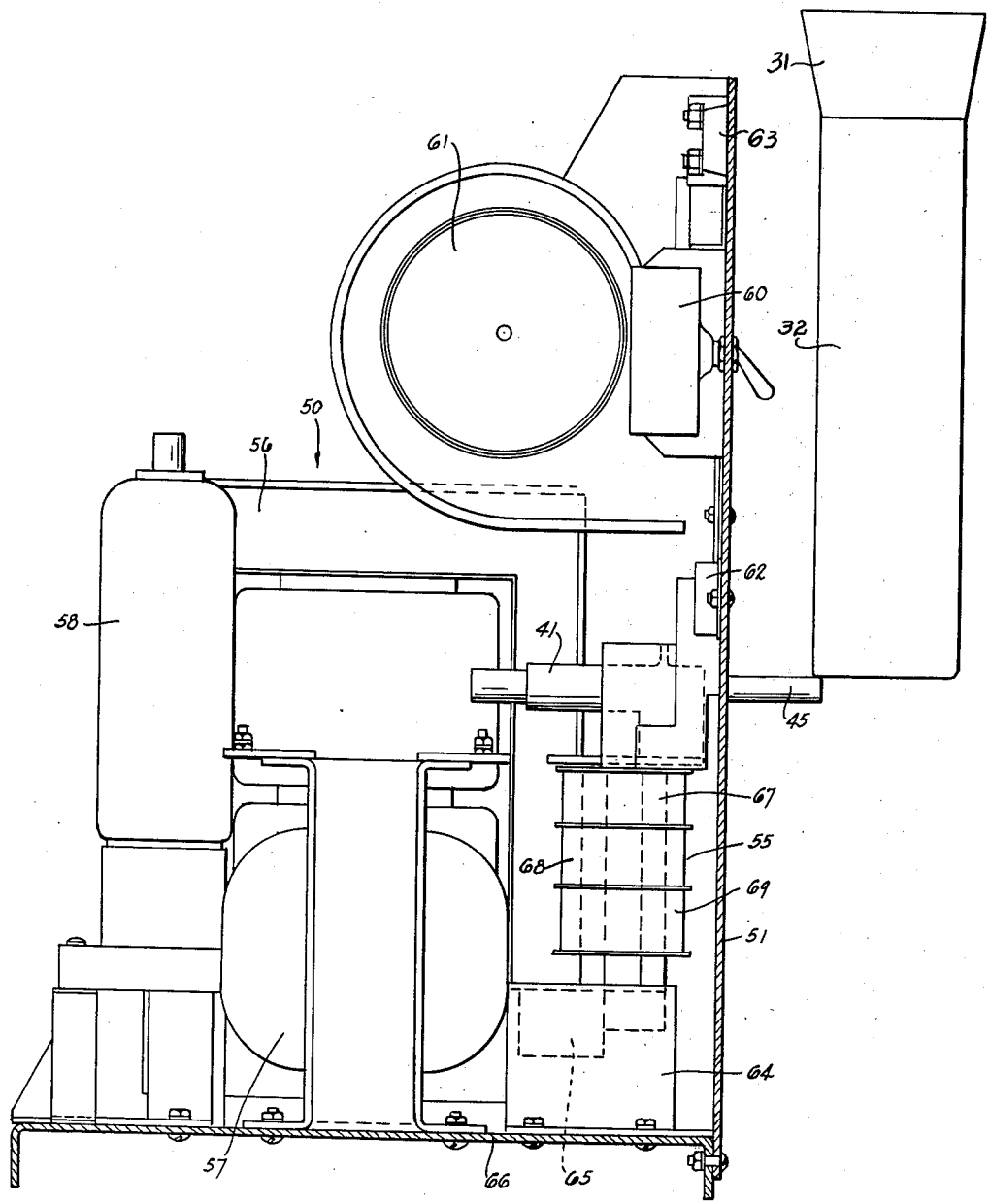

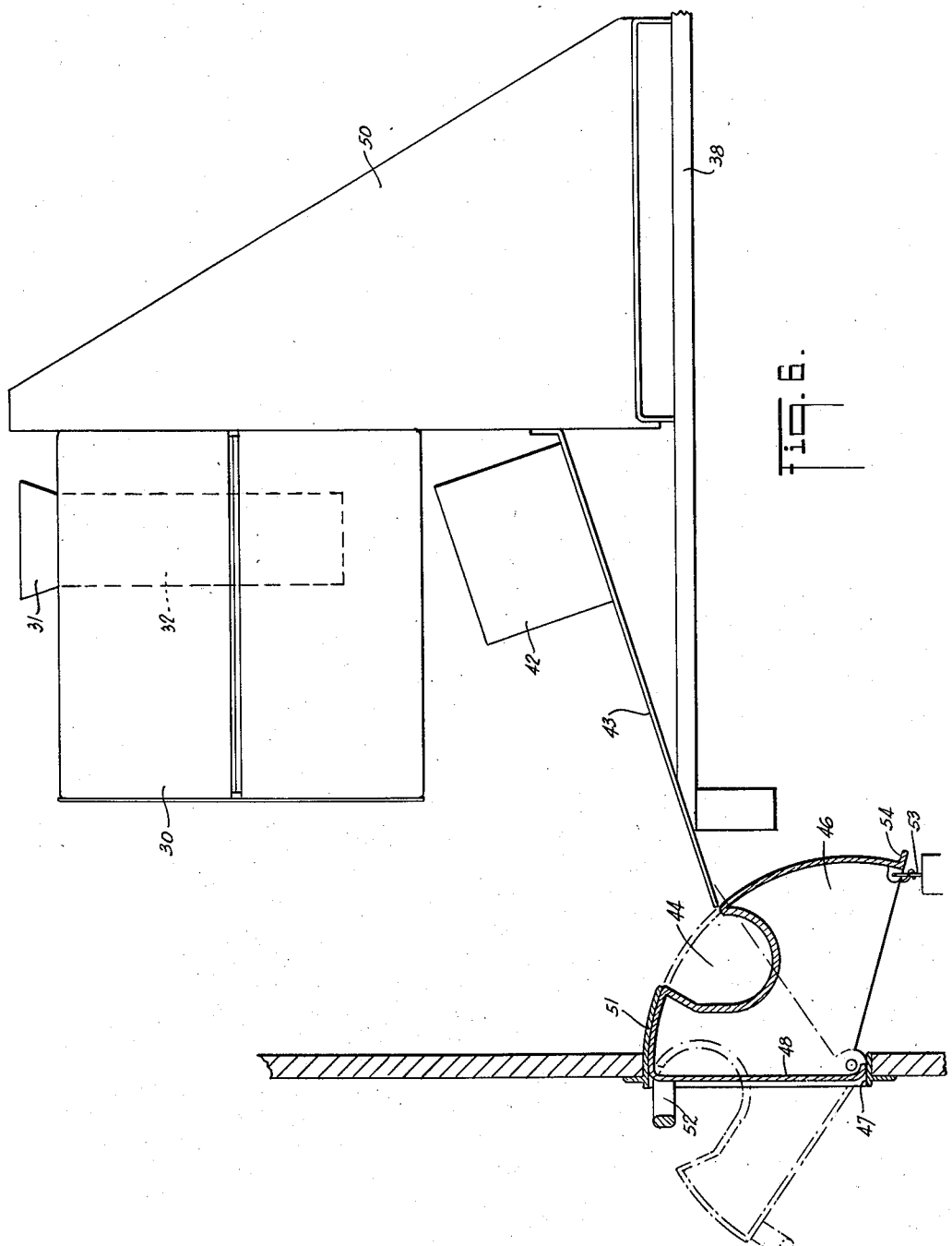

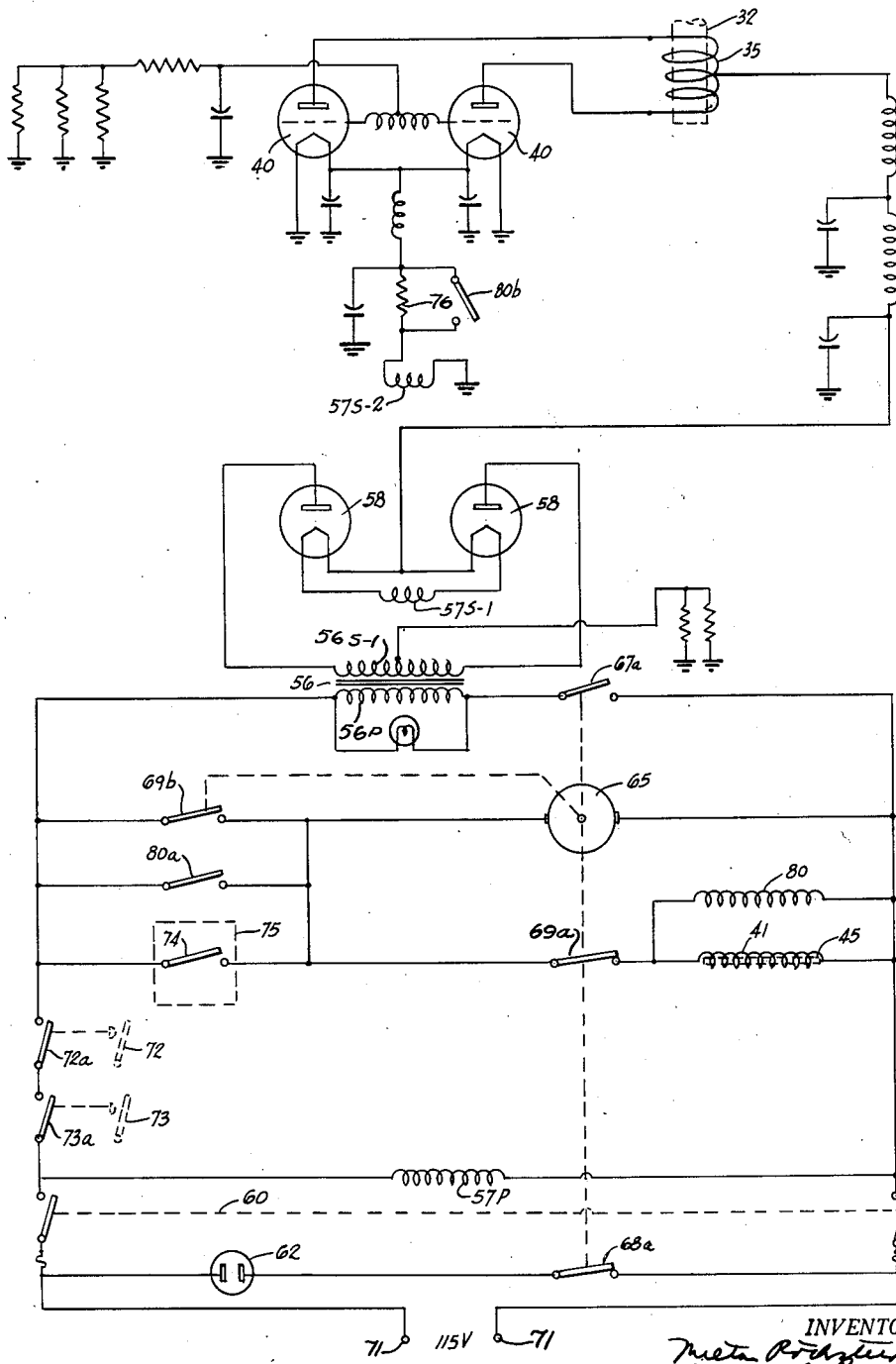

United States Patent Office 2,790,379
Patented Apr. 30, 1957

2,790,379

COIN OPERATED FOOD HEATING AND DISPENSING APPARATUS

Milton Rothstein, Flushing, Arthur L. Rossoff, Lynbrook, and Seymour Yusem, Brooklyn, N. Y., assignors to Radio Receptor Company, Inc., Brooklyn, N. Y., a corporation of New York Application March 26, 1953, Serial No. 344,862

7 Claims. (Cl. 99—357)

This invention relates to coin controlled food dispensing apparatus and, more particularly, to a novel storage, cooking and dispensing unit arranged to rapidly heat or cook an uncooked or partially cooked food article and deliver the hot or cooked article to a purchaser who has activated the unit by inserting therein a coin of a preselected denomination.

Coin operated dispensing devices have long been used for various food products not requiring heating or cooking, such as cold drinks, candy, gum, canned juices, and the like.

However, in the dispensing of solid or liquid food products usually consumed immediately after heating or cooking, certain difficulties are encountered. For example, these products, in the raw or partially cooked, and unheated state, must be preserved from spoilage. At the same time, for effective use in coin operated devices, means must be provided to heat or cook and then deliver the product within a very short interval after a coin is inserted in the apparatus. This is primarily because the average user of a dispensing device is not in a mood to spend a considerable time interval waiting for delivery, one of the advantages of coin-controlled dispensers being the rapidity of service.

Considering these difficulties, there is an unfilled demand for coin-controlled dispensing devices for some of the more popular food items, such as freshly cooked "hot dogs" and hamburgers, and the like.

The present invention fulfills this need by providing a novel combined storage, cooking, and dispensing unit delivering freshly heated or cooked solid or liquid food items in a matter of seconds after insertion of a coin of the proper denomination. To this end, the invention unit includes a refrigerated section in which the raw, or partially cooked or unheated food items, such as, for example, frankfurters or hamburgers, placed in rolls and individually wrapped in a paper napkin, are stored in individual dielectric containers, such as paper tubes, for example, and maintained at a temperature sufficiently low to prevent spoilage.

When a coin of the proper denomination is inserted in the unit, it passes through a coin reject mechanism of a known type where it actuates a switch initiating one operating cycle of the unit. Actuation of the switch immediately releases one food item from the refrigerated section to be fed into a high frequency energy applying electric heater or cooker, holds the item in the cooker, and applies full filament heating voltage to the electronic valves of the cooker.

One second later, the refrigerator section is temporarily deactivated to momentarily decrease the electric load drawn from the line by the unit, this deactivation being followed at a half-second interval by application of high frequency electric energy to the cooker. This sequence is controlled by a synchronous cycling timer which is started responsive to actuation of the coin-controlled switch.

This timer maintains the electric heater energized until nineteen and one-half seconds after the coin insertion and then deenergizes the heater, reactivates the refrigerator, and releases the cooked or hot food item to a delivery guide leading to a special tamper proof hot food item delivery door which the customer may open to obtain the hot food item. At the same time, the filament heating voltage is cut back to a standby value. The complete cycle, from insertion of the coin to receipt of the hot food item by the customer, requires only twenty seconds, thereby adapting the unit to meet the criterion for quick delivery required of automatic dispensing devices.

For an understanding of the invention principles, reference is made to the following detailed description of a typical embodiment thereof as illustrated in the accompanying drawings.

In the drawings:

Fig. 3 is a side elevation view of the radio frequency food heating section;

Fig. 4 is an axial sectional view of the cylindrical cooking unit, illustrating the flow of R. F. energy through the food item;

Fig. 5 is a vertical sectional view through the power supply chassis for the R. F. section, illustrating the food item hold and release means for the cooking unit;

Fig. 6 is a vertical sectional view illustrating the cooked food item delivery and extraction means of the unit; and Fig. 7 is a schematic wiring diagram of the electric circuit of the unit.

Figure 1:
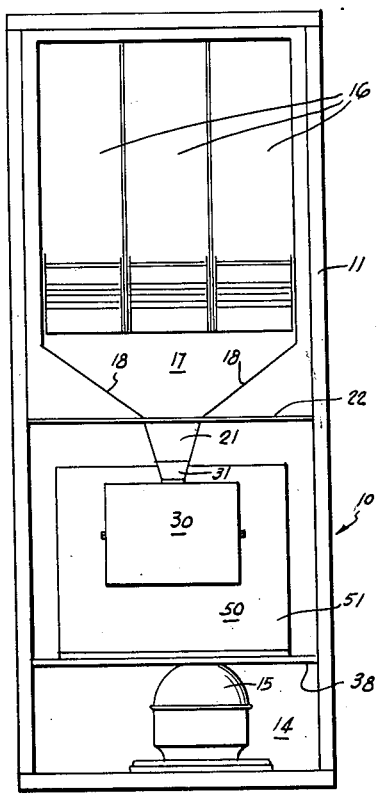
Fig. 1 is a front elevation view of a coin-controlled dispensing unit embodying the invention.
Figure 2:
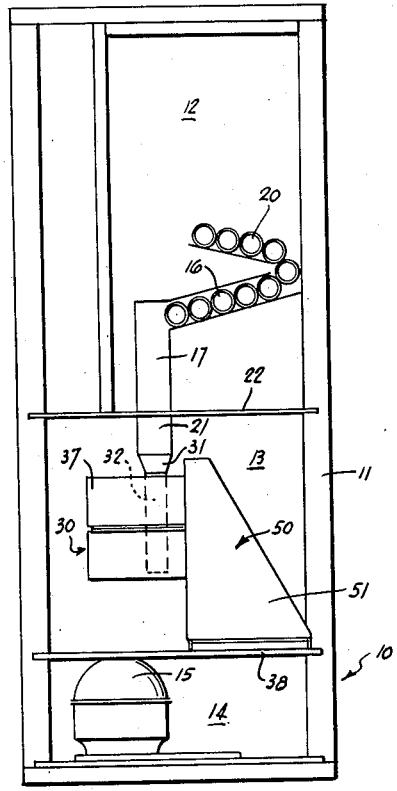
Fig. 2 is a side elevation view of the unit.

In the drawings, the invention is illustrated as incorporated in a coin-controlled dispenser 10 for dispensing freshly cooked "hot dogs" or frankfurters in rolls. Referring first to Figs. 1 through 4, the unit 10 includes a suitable cabinet 11 having an upper refrigerated storage compartment 12 for raw or partly cooked food items, an intermediate compartment 13 containing the electronic high frequency cooker and its power supply, and a bottom compartment 14 housing the refrigerator motor 15.

The upper compartment 12 is divided into a plurality of parallel, generally upwardly extending and preferably zig-zag storage chutes 16 each arranged to contain a plurality of individual food items generally indicated at 20. The chutes 16 are so proportioned as each to hold an aligned series of food items 20 for delivery one at a time to a common hopper element 17 having sloping bottom walls 18 converging toward a discharge spout 21 extending through a partition 22 separating compartments 12 and 13.

The individual packaged food items 20, in the particular embodiment shown, each comprise a raw or partly cooked frankfurter placed inside a roll which is then wrapped in a napkin 24 (Fig. 4) and the wrapped "sandwich" is placed in a cylinder 25 of dielectric material such as paper or cardboard or a suitable plastic composition material. The same arrangement would be used for a hamburger sandwich.

The sloping walls 18 of hopper element 17 cause the cylinders 25 to feed axially or longitudinally into and through spout 21 which discharges the cylinders into the funnel shaped entrance 31 of a vertically disposed glass or dielectric cylinder 32 forming part of the R. F. cooking unit indicated generally at 30.

Cylinder 32 has wound therearound a heavy copper helix or tank coil 35 having terminals 33, 34 between which is applied the R. F. voltage. This voltage develops field lines, such as indicated at 36 in Fig. 4, in the food item. The latter is a poor or "lossy" dielectric, so that energy is expended therein causing the food to be rapidly heated and cooked.

The R. F. energy is supplied by a high frequency class C inductive grid oscillator mounted on a chassis 37 in turn supported on a chassis 51 of a power supply unit 50 mounted on a partition 38 separating compartments 13 and 14. The oscillator includes output tubes such as 40 connected to the terminals 33, 34 of tank coil 35. The R. F. section 30 is described more particularly in connection with Fig. 7.

Referring to Fig. 5, the food item is held in cylinder 32 by a plunger 45 of a solenoid 41 mounted in the power section 50. Plunger 45 is normally retracted, but is projected across cylinder 32 responsive to coin-controlled initiation of the operating cycle. When the food item has been cooked, plunger 45 is retracted to allow the item 20 to move out of cylinder 32.

When solenoid plunger 45 is retracted, the cooked food item 20 in its dielectric cylinder 25 drops from glass cylinder 32 into a receptacle 42 (Fig. 6) from which it rolls downwardly along a delivery guide or chute 43 into a substantially cylindrical longitudinal recess 44 in the periphery of a sector shaped drum section door pivoted about an axis located in the front wall of cabinet 11. Door 46 normally closes a rectangular opening 47 in the cabinet front wall, being formed with a radial closure plate 48 for this purpose. The framed opening 47 cooperates closely with door 46 to seal the opening except when a hot food item is ready for delivery. To this end, the door framing includes a curved plate 51 extending inwardly over the door 46 and having an arcuate extent at least equal to that of recess 44. The door 44 is opened by a handle 52 when the cooked food item is ready for removal. A weight or spring 53 normally biases door 46 to the closed position, and a stop 54 engages guide 43 to limit opening movement of the door. The door construction is such that illegal access to the cabinet interior is prevented.

Control of the cycle of operation is effected by a cycling timer 55 which is mounted in the power supply section 50. This section includes plate voltage transformer 56, filament supply transformer 57, and a pair of rectifier valves 58. The power supply is a full wave rectifier using, in a specific case, two 872 tubes delivering 500 ma. at 3000 volts D. C. A double blower 61 provides for air cooling of the power supply section, and the chassis 51 serves to mount the line switch 60, a receptacle or outlet 62 for the refrigerator connection, and a terminal strip 63 for the line and coin box connections.

The cycle timer is mounted on an inverted U-shape bracket 64 on the base 66 of chassis 51, and includes three switches or circuit controllers 67, 68, 69 operated by rotary cams driven by a synchronous motor 65 mounted within bracket 64.

Operation of the unit during a typical cycle will be understood best with reference to the schematic wiring diagram of Fig. 7. The unit is energized from a two-wire 115 v. supplying terminals 71, the refrigerator unit being plugged into receptacle 62. The front and back doors 72, 73 of the unit must be locked closed to energize safety switches 72a, 73a, and line switch 60 must be closed. Additionally, food items 20 must be stacked in the racks or chutes 16 in the refrigerated compartment 12.

When a coin of the proper denomination is inserted in coin slot 75, it momentarily closes a microswitch 74 which picks up a hold relay or contactor 80 which closes its normally open contacts 80a to establish a shunt circuit around switch 74, and closes its normally open contacts 80b to shunt resistor 76 to apply full heating voltage to the filaments of the oscillator valves 40. The closing of microswitch 74 also pulses a control gate or other known device to allow one food item 20 to descend from a rack 16 into hopper 17 and thence through spout 21 into glass cylinder 32 of the R. F. cooking unit 30.

The solenoid 41 is energized simultaneously with relay 80 to project its plunger 45 across cylinder 32 to hold item 20 in the cylinder until the heating or cooking is completed. Synchronous motor 65 of cycle timer 55 is also energized when switch 74 is closed and relay 80 is energized. One second after motor 65 starts, switch 68 of the timer opens its normally closed contacts 68a to cut out the refrigerator section, reducing the load drawn from the line connected to terminals 71.

One and one-half seconds after motor 65 starts, switch 67 closes its normally open contacts 67a in the circuit of primary winding 56P of plate transformer 56, and voltage is applied to the plate circuits of valves 58 through secondary winding 56S-1. In turn, D. C. voltage from the power section is applied to the plates of oscillator valves 40. Thus, high frequency R. F. energy is supplied to tank coil 35 wound around glass cylinder 32. This high frequency energy cooks the food in the unit 20 when in cylinder 32.

The cooking continues until nineteen seconds after the start of the cycle, at which time switch 67 reopens contacts 67a to interrupt the R. F. energization of coil 35. One-half second later, switch 68 re-closes contacts 68a to re-enenrgize the refrigerating unit.

At nearly twenty seconds from the start of the cycle, switch 69 momentarily opens and then re-closes its normally closed contacts 69a. This breaks the holding circuit of relay 80, which opens its contacts 80a and 80b, the latter cutting off the full filament voltage to valves 40, and the filament voltage is reduced to a standby value by the resistor 76 connected in series with secondary winding 57S-2 of filament transformer 57. As solenoid 41 is deenergized, its plunger 45 is withdrawn allowing the cooked food item 20 to fall out of cylinder 32 to pass to the extraction door 46 for removal by the customer.

At the same time, normally open switch contact 69b is closed and immediately re-opened, in synchronism with the momentary opening and re-closing of switch contacts 69a. This allows motor 65 to continue running to restore timer 55 to the initial position. The re-closing of contacts 69a restores the circuit to its normal deactivated condition.

The cycle may be summarized in the following table, the start or "zero seconds" condition being the time of coin insertion:

0 seconds—Food unit passes from refrigerator into cooking unit and is held by plunger 45. Full filament voltage applied.
1 second—Refrigerator shut off,
1.5 seconds—R. F. energy starts cooking food,
19 seconds—R. F. energy stops cooking food,
19.5 seconds—Refrigerator turned on,
20 seconds—Food unit released from R. F. cooker. Filament voltage reduced to standby value.

The unit thus acts to store raw or partly cooked food and to deliver this food, heated or cooked, to the customer within twenty seconds after insertion of a coin into the unit. Thereby, delivery of hot food items within the time limitations normally expected of coin-operated vending unit is fulfilled by a compact, economical unit with low drain on a power supply line.

While a specific embodiment of the invention has been shown and described in detail to illustrate the application of the invention principles, it will be understood that the invention may be embodied otherwise without departing from such principles.

We claim:
1. Coin-controlled apparatus for heating and vending perishable food items comprising, in combination, a refrigerated storage section arranged to store a plurality of individual perishable food items; an electric supply cir- cuit for said apparatus; electrically energized refrigeration means for said section connected to said supply circuit; a high frequency energy applying electric heater having an energizing circuit connected to said supply circuit and having an entrance disposed to receive individual food items from said storage section; delivery means constructed and arranged to deliver heated food items from the discharge end of said heater to a customer; a normally retracted stop projectable into the path of the food items at the discharge end of said heater; an electric cycle timer; an electric operator arranged, when energized, to project said stop to retain a food item in said heater; a hold contactor incorporating normally open contacts in a hold circuit for itself, said timer, and said electric operator connected to said supply circuit; a coin-operated switch controlling initial energization of said contactor, said timer, and said electric operator from said supply circuit, and delivery of a food item from said storage section to said heater; a first timer-operated circuit controller in the energizing circuit of said heater; a second timer-operated circuit controller in said hold circuit; a third timer-operated circuit controller controlling energization of said refrigeration means from said supply circuit; said timer, when energized, closing said first controller and maintaining said second controller closed and, just before the end of a cycle, opening said first controller and opening and immediately re-closing said second controller; said timer, immediately after the start of a cycle, opening said third controller and re-closing the same substantially simultaneously with opening of said first controller to disconnect the refrigerator means from said supply circuit to reduce the potential demand on the latter during energization of said heater.

2. Apparatus as claimed in claim 1 in which said heater is a dielectric tube and said generator is an R. F. oscillator having a tank coil wound on said tube.

3. Apparatus as claimed in claim 1 in which said heater is disposed above said delivery means and said storage section is above said heater, for gravity delivery of the food items to the heater and thence to the customer, said heater is a dielectric tube, vertically disposed, and said generator is an R. F. oscillator having a tank coil wound on said tube.

4. Apparatus as claimed in claim 1 in which said heater is a dielectric tube and said generator is an R. F. oscillator having a tank coil wound on said tube; the filaments of said oscillator being energized during stand-by periods through a series impedance and said second normally open contacts being in shunt with said impedance.

5. Apparatus as claimed in claim 1 in which said heater is disposed above said delivery means and said storage section is above said heater, for gravity delivery of the food items to the heater and thence to the customer, said heater is a dielectric tube, vertically disposed, and said generator is an R. F. oscillator having a tank coil wound on said tube; said electric operator being a solenoid and said stop being a solenoid plunger movable across the lower end of said tube.

6. Coin-controlled apparatus for heating and vending perishable food items comprising, in combination, a refrigerated storage section arranged to store a plurality of individual perishable food items; an electric supply circuit for said apparatus; electrically energized refrigeration means for said section connected to said supply circuit; a high frequency energy applying electric heater having an entrance disposed to receive individual food items from said storage section; delivery means constructed and arranged to deliver heated food items from the discharge end of said heater to a customer; a high frequency electric generator for delivering high frequency energy to said heater; power supply means for said generator having an energizing circuit connected to said supply circuit; a normally retracted stop projectable into the path of the food items at the discharge end of said heater; an electric cycle timer; an electric operator arranged, when energized, to project said stop to retain a food item in said heater; a hold contactor incorporating first normally open contacts in a hold circuit for itself, said timer, and said electric operator connected to said supply circuit; a coin-operated switch controlling initial energization of said contactor, said timer, and said electric operator from said supply circuit, and delivery of a food item from said storage section to said heater; second normally open contacts incorporated in said hold contactor and controlling filament heating of said generator from said supply circuit; a first timer-operated circuit controller in the energizing circuit of said power supply means; a second timer-operated circuit controller in said hold circuit; a third timer-operated circuit controller controlling energization of said refrigeration means; said timer, when energized, closing said first controller and maintaining said second controller closed and, just before the end of a cycle, opening said first controller and opening and immediately re-closing said second controller, said timer, immediately after the start of a cycle, opening said third controller and re-closing the same simultaneously with opening of said first controller to disconnect the refrigerator means from said supply circuit to reduce the potential demand on the latter during energization of said heater.

7. Apparatus as claimed in claim 6 including a cabinet having a partition therein; a chassis for said power supply means mounted on said partition and having a vertical wall; and a chassis for said generator supported on said vertical wall.

References Cited in the file of this patent

UNITED STATES PATENTS

| | | |
|---|---|---|
| 1,716,266 | Flamm | June 4, 1929 |
| 2,256,976 | Ford | Sept. 23, 1941 |
| 2,363,724 | Ford | Nov. 28, 1944 |
| 2,384,863 | Warner | Sept. 18, 1945 |
| 2,392,511 | Thompson et al. | Jan. 8, 1946 |
| 2,531,238 | Tandler et al. | Nov. 21, 1950 |